United States Patent
Yu et al.

(10) Patent No.: US 10,984,342 B2
(45) Date of Patent: Apr. 20, 2021

(54) USING ARTIFICIAL INTELLIGENCE TO DETERMINE A VALUE FOR A VARIABLE SIZE COMPONENT

(71) Applicant: Stitch Fix, Inc., San Francisco, CA (US)

(72) Inventors: Zhou Yu, Sunnyvale, CA (US); Ian Andrew Hepworth, San Francisco, CA (US); Daragh Edgar Sibley, San Francisco, CA (US)

(73) Assignee: Stitch Fix, Inc., San Francisco, CA (US)

( * ) Notice: Subject to any disclaimer, the term of this patent is extended or adjusted under 35 U.S.C. 154(b) by 854 days.

(21) Appl. No.: 15/729,275

(22) Filed: Oct. 10, 2017

(65) Prior Publication Data

US 2019/0108458 A1     Apr. 11, 2019

(51) Int. Cl.

| | |
|---|---|
| *G06N 20/00* | (2019.01) |
| *G06N 7/00* | (2006.01) |
| *A41H 43/00* | (2006.01) |
| *G06Q 30/06* | (2012.01) |
| *A41H 3/00* | (2006.01) |
| *G06Q 50/04* | (2012.01) |

(52) U.S. Cl.
CPC ............ *G06N 20/00* (2019.01); *A41H 43/00* (2013.01); *G06N 7/005* (2013.01); *A41H 3/007* (2013.01); *G06Q 30/0621* (2013.01); *G06Q 50/04* (2013.01)

(58) Field of Classification Search
USPC ........................................................ 706/12
See application file for complete search history.

(56) References Cited

U.S. PATENT DOCUMENTS

| | | | | |
|---|---|---|---|---|
| 6,546,309 | B1 * | 4/2003 | Gazzuolo | G06Q 30/0601 33/512 |
| 7,194,327 | B2 * | 3/2007 | Lam | A41H 3/007 341/87 |
| 7,346,421 | B2 * | 3/2008 | Bijvoet | A41H 1/00 700/130 |
| 8,478,663 | B2 * | 7/2013 | Lu | G06Q 30/00 705/26.7 |
| 8,762,292 | B2 * | 6/2014 | Bright | G06Q 10/04 705/347 |
| 2008/0255920 | A1 | 10/2008 | Vandergriff | |
| 2010/0023421 | A1 | 1/2010 | Wannier | |
| 2010/0111370 | A1 | 5/2010 | Black | |
| 2011/0083331 | A1 | 4/2011 | Hopman | |
| 2011/0099122 | A1 * | 4/2011 | Bright | G06Q 10/04 705/348 |

(Continued)

OTHER PUBLICATIONS

Hastie et al, "Generalized Additive Models", from Statistical Science, vol. 1, No. 3, pp. 297-310, 1986.

*Primary Examiner* — Michael B Holmes
(74) *Attorney, Agent, or Firm* — Van Pelt, Yi & James LLP

(57) ABSTRACT

A machine learning model for predicting a size fit satisfaction for a variable size component is trained using at least sizing profiles of a plurality of items and feedbacks of subjects regarding sizing of the plurality of items. The machine learning model is used to determine a value for the variable size component that corresponds to an optimal predicted size fit satisfaction. The determined value of the variable size component is provided for use in creating a new item with a sizing variation based on the determined value.

20 Claims, 9 Drawing Sheets

(56) References Cited

U.S. PATENT DOCUMENTS

| | | |
|---|---|---|
| 2011/0231278 A1 | 9/2011 | Fries |
| 2014/0040041 A1 | 2/2014 | Ohnemus |
| 2014/0244431 A1* | 8/2014 | Bright .................... G06Q 10/04 705/26.7 |
| 2016/0292765 A1 | 10/2016 | Jin |
| 2017/0039622 A1 | 2/2017 | Chen |
| 2017/0273383 A1 | 9/2017 | Deguzman |
| 2019/0073335 A1* | 3/2019 | Foley ................ G06Q 30/0601 |

* cited by examiner

US 10,984,342 B2

USING ARTIFICIAL INTELLIGENCE TO DETERMINE A VALUE FOR A VARIABLE SIZE COMPONENT

BACKGROUND OF THE INVENTION

Traditional garment design relies on a single human fit model to generate garment measurements. A garment is cut and measured to the specific fit model to create a base design for manufacturing. Smaller or larger sizes of the garment style are created by scaling variable size components of the base design such as the shoulder width for tops and the inseam for pants. Often the scaling is performed by a standard amount to create standard sizes. The use of standard scaling and the reliance on a single or even a handful of fit models to create different garment sizes results in poor fitting garments for many people. Individuals seeking the best fit often take an alternative approach and have a garment made bespoke to the individual's measurements. A bespoke garment is time consuming and expensive to make and the variable size components are customized to fit the individual it is created for. For a more universal approach, it is desirable to automatically scale variable size components to create a newly sized garment to fit the optimal number of individuals.

BRIEF DESCRIPTION OF THE DRAWINGS

Various embodiments of the invention are disclosed in the following detailed description and the accompanying drawings.

DETAILED DESCRIPTION

Figure 1:
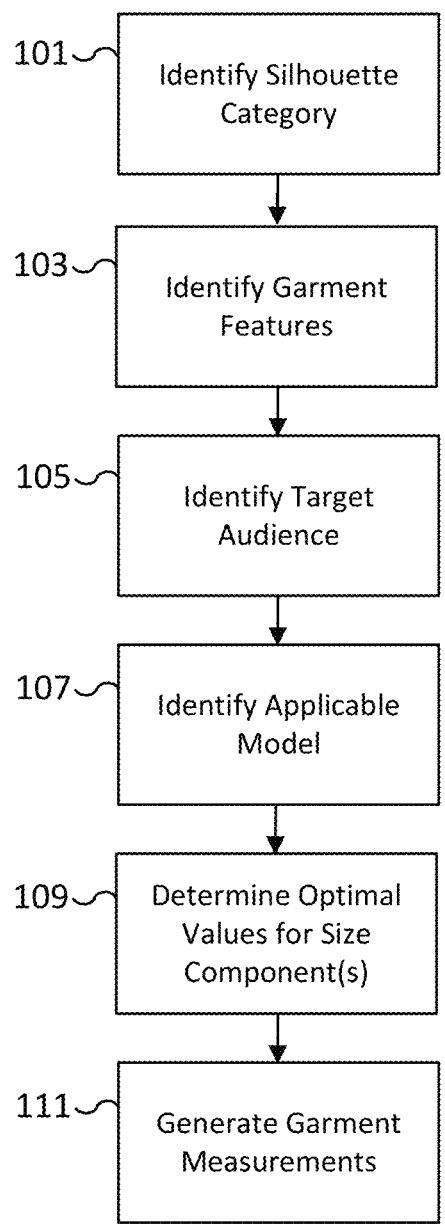
FIG. 1 is a flow chart illustrating an embodiment of a process for determining a value for a variable size component.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Using artificial intelligence to assist in the design, purchase, and manufacturing of garments is disclosed. New products are commonly designed by fitting a garment style to a single human fit model. Different garment sizes of the product are created by scaling up and down variable size components of the base garment design. Using artificial intelligence and machine learning, the values for variable size components are determined that optimize the design of new garment sizes. Machine learning models may be trained using sizing feedback and fit feedback from users having tried prior garments and detailed points of measurement of the prior garments. Garment products are distinguished by silhouette category to determine the points of measurement required for automatic determination of variable size components. Utilizing a fit analysis engine to train and apply a machine learning model, new garment products may be designed, purchased, and manufactured that accurately fit a customer or group of customers. The new garment is designed by using the determined values for variable size components by optimizing for size fit satisfaction with respect to the target customers.

In various embodiments, a processor is used to train a machine learning model for predicting a size fit satisfaction for a variable size component. For example, each garment contains multiple measurements required for the construction of the garment. Measurements for a particular garment depend on the garment's silhouette category. As an example, measurements for a pair of pants typically include inseam and waist measurements. Additional measurements for a more satisfactory fit and consistency in manufacturing may be utilized and may include measurements for the seat, thigh at the crutch, thigh a certain distance from the crutch, knee, front leg opening, back leg opening, front rise, back rise, and outseam, among others. Using a base garment, typically sized as a canonical medium size, different sizes for the garment style are created by scaling up or down the variable size components. Scaling one or more variable size components down creates a smaller size. Scaling one or more variable size components up creates a larger size. An even smaller or larger size may be created with additional scaling down or up. The scaling may not be arbitrary since each variable size component may contribute to the overall fit of the garment. The size fit satisfaction for a particular customer is based on how accurate the values for the variable size components are determined. A new garment with optimal variable size components will fit well and achieve a high size fit satisfaction. In contrast, size components that result in a poor fitting garment achieve a low size fit satisfaction.

In some embodiments, the machine learning model used to predict the variable size components is trained using at least the sizing profiles of a plurality of items and the feedbacks of subjects regarding sizing of the plurality of items. For example, the training corpus includes sizing profiles of the various garments. A sizing profile for a garment includes detailed measurements particular for that garment and size. In some embodiments, the points of measurement, that is, the specific measurements for each garment, are based on the garment's silhouette category. The training corpus also includes feedback on the particular garment. In some embodiments, the feedback includes a sizing rating and a fit rating. In some embodiments, a fit rating is a rating on how well the garment fits for a particular person. In some embodiments, a size rating is a rating on the accuracy of the labeled size. In various embodiments, the feedback may be sourced from a customer, a stylist, a designer, and/or a supplier, among others. In some embodiments, feedback includes a user's size measurements, such as the user's height, as well as user fit challenges and user fit preferences.

Once trained, the machine learning model is used to determine a value for the variable size component that corresponds to an optimal predicted size fit satisfaction. For example, to achieve an optimal predicted size fit satisfaction for a dress shirt, the machine learning model may be applied to determine a size for the front body length of the shirt for a corresponding shoulder size. In some embodiments, more than one variable size component is determined to achieve an optimal predicted size fit satisfaction. For example, values for the front body length and the sleeve length are determined for a corresponding shoulder size.

Once a value is determined for a variable size component, the determined value is provided for use in selecting a new item with a variable size component based on the determined value. For example, a new item may be a newly sized garment having the same style as a base garment but replaces variable size components with their determined values optimized for size fit satisfaction for each applicable point of measurement. In some embodiments, the new item is used to select from one of multiple sizes for purchasing based on size fit satisfaction. In some embodiments, the new item and its design measurements are used to initiate the manufacturing of the item. The determined variable size component values include the measurements necessary for the garment to be manufactured in the newly created size. The result is a garment that is designed, ordered, purchased, and/or manufactured using size measurements based on the optimal size fit satisfaction.

FIG. 1 is a flow chart illustrating an embodiment of a process for determining a value for a variable size component. In some embodiments, at least some of the products selected and provided to the customer may be products generated according to the processes described herein. In some embodiments, the process of FIG. 1 is performed by processor 201 of FIG. 2. The process of FIG. 1 may be at least in part implemented on one or more components of system 300 shown in FIG. 3. For example, the process may be performed by utilizing fit analysis engine 307, design tool 309, and data platform 313 with respect to feedback data store 301, sizing profile data store 303, and inventory interface 305. In some embodiments, the process of FIG. 1 utilizes a machine learning model trained using the process described with respect to FIG. 6.

At 101, a silhouette category is identified. In some embodiments, in order to design a garment based on variable size components, a silhouette category is identified for the intended garment. A product silhouette category may be used to define a unique category of garments that share the same general cut, shape, and in some cases material. In some embodiments, the garment shape and/or cut as well as material or construction additionally define a garment silhouette. Examples of silhouette categories include sport coats, long sleeve tops, short sleeve tops, three-quarter sleeve tops, pull over tops, sleeveless tops, shorts, and jeans, among others. Examples of material and/or construction include woven, knit, and denim, among others. As another example, in order to design and size a long sleeve knit dress shirt, a silhouette category corresponding to the long sleeve knit dress shirt is identified.

In some embodiments, the silhouette category is based on a base garment. For example, a base garment may be designed and sized using a human model. The garment is fitted to a human having a known or defined canonical size, for example, a size medium for a 6'1 tall male model. A base garment is thus created by sizing variable size components to the fit model. The base garment may then be utilized as a template to create variations of sizes by either scaling up or down certain variable size components. This scaling is used to create different canonical sizes such as extra-small, small, large, extra-large, etc. Further, scaling can be used to create new size variations accounting for different variable size components. For example, for a fixed shoulder width but variable height, different variations of a canonical medium size, such as tall-medium, short-medium, slim-medium, super-slim-medium, regular-medium, husky-medium, etc., can be created. Similarly, depending on the garment silhouette, different size variations of a garment may be created by adjusting different variable size components. For example, different size variations may be created by adjusting for longer or shorter sleeves, larger or smaller neck openings, larger or smaller thigh measurements, etc.

In some embodiments, the variable size components of a garment are based on size components that impact the fit rating of a garment. For example, measurements that have little or no impact on fit rating are not variable size measurements. In contrast, a measurement that does impact the fit rating may be designated as a variable size component. In some embodiments, A/B testing is performed to determine which measurements impact fit rating and are suitable for variable sizing. As an example, two long sleeve dress shirts are manufactured with identical measurements except for sleeve length. The shirts are tested by users and a fit rating feedback is received from each user for each shirt. In the event the sleeve length impacts the fit rating, the sleeve length may be designated as a variable size component. On the other hand, in the event the sleeve length does not impact fit rating, the sleeve length may be excluded as a variable size component.

At 103, garment features are identified. In some embodiments, the garment features are identified based on the identified silhouette category. Garment features include the points of measurement for the garment. The points of measurement include specific measures for any garment of the garment category. As an example, a long sleeve knit dress shirt may require the points of measurement to include measurements for the neck opening, shoulder-to-shoulder, chest, waist, hem, neck band, front neck drop, front body length, sleeve length from armhole to edge, under sleeve length from armhole to edge, bicep, and sleeve opening. In some embodiments, the garment features are the variable size components. One or more variable size components may be determined to achieve an optimal size fit satisfaction. In various embodiments, additional or fewer measurements and/or features may be appropriate depending on the garment category and size fit satisfaction goal.

In some embodiments, features other than measurements may be included to achieve goals in addition to a size fit satisfaction goal. Additional input for features may also include style rating, size rating, fit rating, quality rating, retention, personalization, style, material, and other input, as appropriate, in order to achieve additional optimization goals. Examples of additional optimization goals include optimizing for quality, retention, personalization, and style.

At 105, a target audience is identified. Target audiences may be selected based on one or more characteristics including time frame, purchase history, likelihood of purchase, length as a customer, sizing information of the customer, etc. For example, the target audience may be customers that are likely to purchase a product in the next week. Another target audience may be customers sharing a subset of size measurements. In various embodiments, the target audience is identified by clustering potential customers based on similar features, such as size measurements, physical location, purchase history, style preference, pattern preference, material preference, fit challenges, fit preferences, etc. For example, in designing a denim product, a target audience may be selected based on the likelihood the customer will purchase a denim garment. Additional customer preferences such as body shape, size measurements, and price range preferences, among others, may also be used to further refine the target audience.

At 107, applicable machine learning models are identified. For example, one or more machine learning models are identified for predicting a size fit satisfaction. The one or more models are identified based on the optimization goal, identified silhouette, identified features, and target audience. In some embodiments, a different model exists for different target audiences. For example, a model may exist for male customers and one for female customers. As another example, a different model may exist for silhouette categories corresponding to denim pants and knit long sleeve tops. In some embodiments, different models may be utilized based on the points of measurement corresponding to the garment silhouette category. At least one of the models is trained using the sizing profiles of one or more garments. For example, measurements for garments corresponding to a single garment silhouette category are used to train a machine learning model. At least one of the models is trained using feedback from subjects regarding the size of one or more items. For example, sizing and fit ratings are utilized with the corresponding garment sizing profile as data for a training corpus for training a machine learning model.

In various embodiments, the models are trained by utilizing a cost function to determine appropriate weights for the model. In some embodiments, the non-linear property of spline functions are utilized as an alternative to linear regression and a linear logistic model. For example, as a first step, a base is generated to create a non-linear function that maps space into multiple dimensions. In some embodiments, polynomial functions are utilized for multiple dimensions and/or degrees of freedom. As a second step, regularization is performed to reduce the degrees of freedom. In various embodiments, the training corpus utilizes data from feedback data store 301 and sizing profile data store 303 of FIG. 3.

Figure 3:
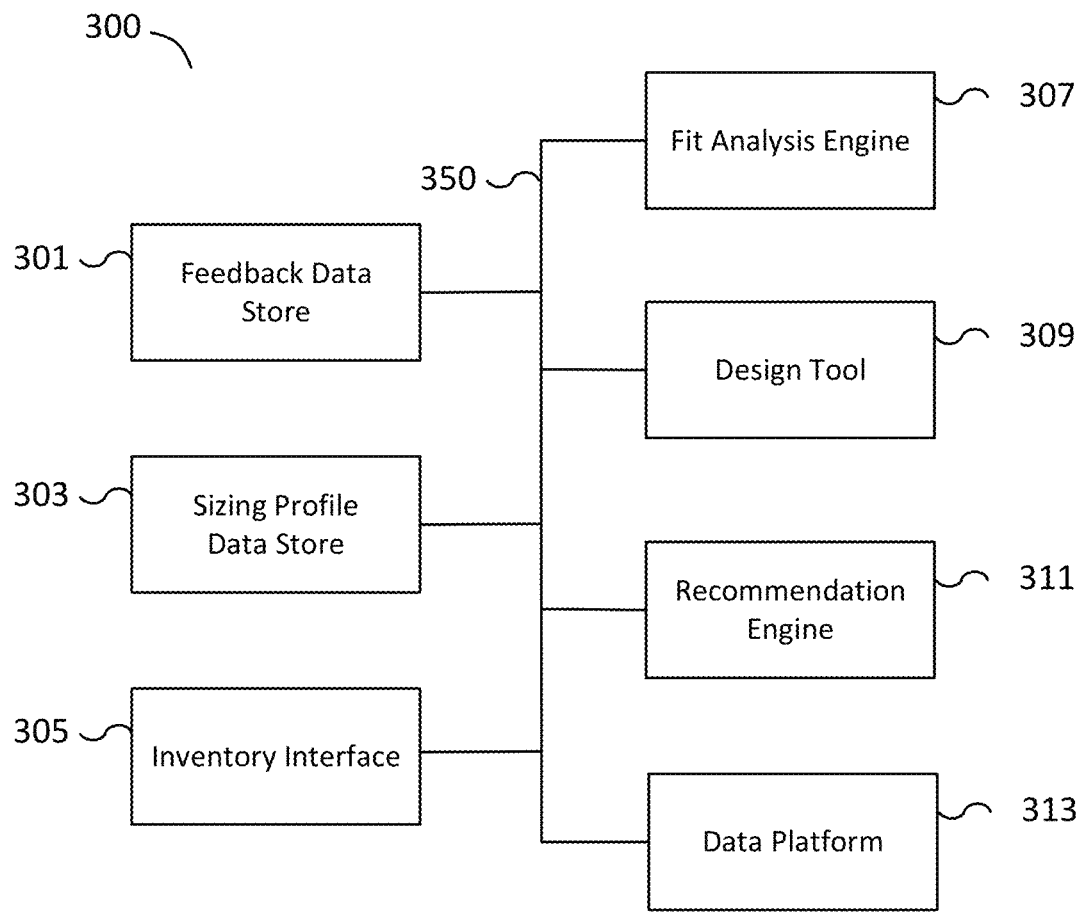
FIG. 3 is a block diagram illustrating an embodiment of a system for determining a value for a variable size component.

At 109, optimal values for variable size components are determined using the machine learning models identified at 107. The optimal values are determined by performing one or more size fit satisfaction inferences with variable size components. In some embodiments, the value for a variable size component is determined by optimizing for a size fit satisfaction, for example, by solving for highest probability corresponding to a size fit satisfaction. For example, in the design of a dress shirt, variable size components may include a sleeve length, the distance from the top of the shirt to the first button, a neck length, a bicep size, a body length, etc. At 109, the optimal values for the different variable size components are determined for the target audience. In some embodiments, some size components may be fixed and may be based on the base garment. For example, it may be desirable to keep a shoulder size fixed when solving for one or more variable size components. In various embodiments, the shoulder size varies and defines a canonical size while one or more variable size components are varied to define variable sizes of the same canonical size, such as medium-short, medium-tall, medium-slim, medium-regular, and medium-husky. In various embodiments, fit analysis engine 307 of FIG. 3 is utilized for determining the optimal values for variable size components.

At 111, garment measurements are generated based on the determined values for the variable size components. In some embodiments, the base garment provides a subset of the measurements needed and the determined values for the variable size components provide the remaining values. The set of garment measurements is necessary for defining a new garment. In some embodiments, the measurements are utilized to select the best fitting garment for one or more customers. In some embodiments, the generated garment is compared with garments from different vendors and/or available inventory for purchase and purchase decisions are based on the best match to the generated garment(s). In some embodiments, the generated garment is selected for manufacturing. In various embodiments, the garment measurements generated at 111 are produced by using design tool 309 of FIG. 3. In some embodiments, inventory interface 305 of FIG. 3 is utilized to retrieve inventory information, which may be used to determine which generated garments to manufacture and/or purchase.

Figure 2:
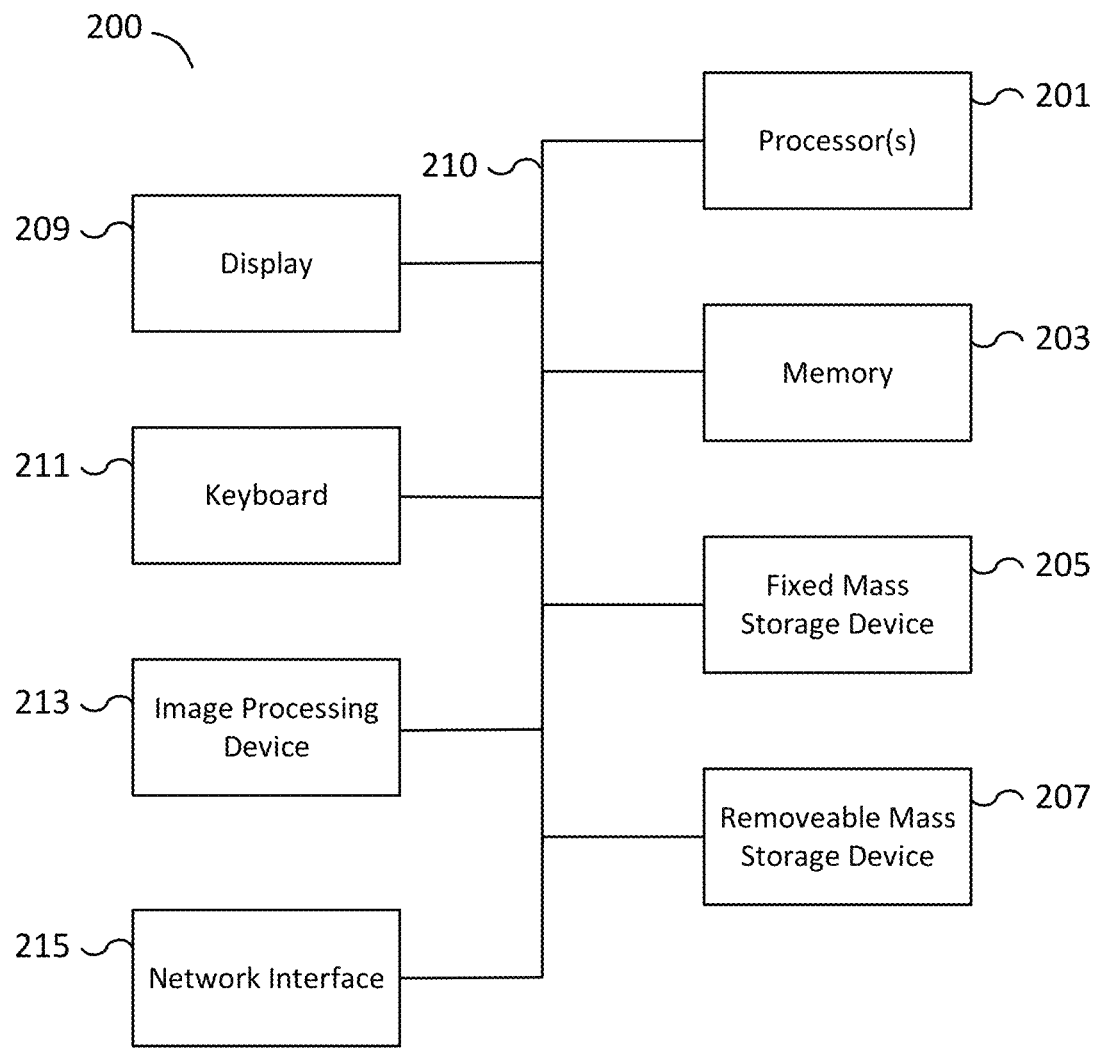
FIG. 2 is a functional diagram illustrating a programmed computer system for determining a value for a variable size component.

FIG. 2 is a functional diagram illustrating a programmed computer system for determining a value for a variable size component in accordance with some embodiments. As will be apparent, other computer system architectures and configurations can be used to perform the described product generation technique. Computer system 200, which includes various subsystems as described below, includes at least one microprocessor subsystem (also referred to as a processor or a central processing unit (CPU) 201). In some embodiments, computer system 200 is a virtualized computer system providing the functionality of a physical computer system. For example, processor 201 can be implemented by a single-chip processor or by multiple processors. In some embodiments, processor 201 is a general purpose digital processor that controls the operation of the computer system 200. In some embodiments, processor 201 also includes one or more coprocessors or special purpose processors (e.g., a graphics processor, a network processor, etc.). Using instructions retrieved from memory 203, processor 201 controls the reception and manipulation of input data received on an input device (e.g., keyboard 211, image processing device 213, etc.), and the output and display of data on output devices (e.g., display 209).

In some embodiments, processor 201 is used for determining a value for a variable size component for designing, creating, purchasing, and/or manufacturing garments. Processor 201 is used to train a machine learning model for predicting a size fit satisfaction for a variable size component. Once trained, processor 201 utilizes the machine learning model to determine a value for the variable size component that corresponds to an optimal predicted size fit satisfaction. The determined value is provided using processor 201 for use in selecting a new item with a sizing variation based on the determined value.

In some embodiments, processor 201 includes and/or is used to provide elements 101, 103, 105, 107, 109, and 111 with respect to FIG. 1. In some embodiments, processor 201 is used to communicate with or provide the functionality of data stores 301 and 303 and inventory interface 305 of FIG. 3. In some embodiments, processor 201 is utilized by the elements 307, 309, 311, and 313 of FIG. 3. In some embodiments, processor 201 performs the processes described below with respect to FIGS. 4, 5A, and 6-8.

Processor 201 is coupled bi-directionally with memory 203, which can include, for example, one or more random access memories (RAM) and/or one or more read-only memories (ROM). As is well known in the art, memory 203 can be used as a general storage area, a temporary (e.g., scratch pad) memory, and/or a cache memory. Memory 203 can also be used to store input data and processed data, as well as to store programming instructions and data, in the form of data objects and text objects, in addition to other data and instructions for processes operating on processor 201. Also as is well known in the art, memory 203 typically includes basic operating instructions, program code, data, and objects used by the processor 201 to perform its functions (e.g., programmed instructions). For example, memory 203 can include any suitable computer readable storage media described below, depending on whether, for example, data access needs to be bi-directional or uni-directional. For example, processor 201 can also directly and very rapidly retrieve and store frequently needed data in a cache memory included in memory 203.

A removable mass storage device 207 provides additional data storage capacity for the computer system 200, and is optionally coupled either bi-directionally (read/write) or uni-directionally (read only) to processor 201. A fixed mass storage 205 can also, for example, provide additional data storage capacity. For example, storage devices 205 and/or 207 can include computer readable media such as magnetic tape, flash memory, PC-CARDS, portable mass storage devices such as hard drives (e.g., magnetic, optical, or solid state drives), holographic storage devices, and other storage devices. Mass storages 205 and/or 207 generally store additional programming instructions, data, and the like that typically are not in active use by the processor 201. It will be appreciated that the information retained within mass storages 205 and 207 can be incorporated, if needed, in standard fashion as part of memory 203 (e.g., RAM) as virtual memory.

In addition to providing processor 201 access to storage subsystems, bus 210 can be used to provide access to other subsystems and devices as well. As shown, these can include a display 209, a network interface 215, an input/output (I/O) device interface 211, an image processing device 213, as well as other subsystems and devices. For example, image processing device 213 can include a camera, a scanner, etc.; I/O device interface 211 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 200. Multiple I/O device interfaces can be used in conjunction with computer system 200. The I/O device interface can include general and customized interfaces that allow the processor 201 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 215 allows processor 201 to be coupled to another computer, computer network, or telecommunications network using a network connection as shown. For example, through the network interface 215, the processor 201 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 201 can be used to connect the computer system 200 to an external network and transfer data according to standard protocols. For example, various process embodiments disclosed herein can be executed on processor 201, or can be performed across a network such as the Internet, intranet networks, or local area networks, in conjunction with a remote processor that shares a portion of the processing. Additional mass storage devices (not shown) can also be connected to processor 201 through network interface 215.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 2 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 211 and display 209 share the touch sensitive screen component, which both detects user inputs and displays outputs to the user). In addition, bus 210 is illustrative of any interconnection scheme serving to link the subsystems. Other computer architectures having different configurations of subsystems can also be utilized.

FIG. 3 is a block diagram illustrating an embodiment of a system for determining a value for a variable size component. In some embodiments, values for variable size components are determined and garments using the determined components may be created using the processes described herein. The example system 300 shown in FIG. 3 includes feedback data store 301, sizing profile data store 303, inventory interface 305, fit analysis engine 307, design tool 309, recommendations engine 311, and data platform 313. Each of these components may be communicatively coupled via network 350. In some embodiments, system 300 is used to perform the processes described with respect to FIGS. 1, 4, 5A, and 6-8.

The feedback data store 301 and sizing profile data store 303 may be configured to store information about customers, products, sales data, performance metrics, and machine learning models. In some embodiments, feedback data store 301 may be utilized for storing feedback from users or customers related to products and sizing profile data store 303 may be utilized for storing sizing profile data regarding different garment products. In some embodiments, feedback data store 301 and sizing profile data store 303 may exist as a single unified data store or spread across multiple data stores.

In some embodiments, the feedback data store 301 stores information including customer or user feedback on size, fit rating, quality, print/style, and price for any test fitted garment. In some embodiments, the feedback includes feedback from a stylist, designer, and/or supplier. In some embodiments, the feedback includes user size measurements, fit challenges, and fit preferences. In various embodiments, the feedback includes a corresponding reference to a garment with sizing profile information in the sizing profile data store. In some embodiments, a garment is referenced using a garment identifier or a stock keeping unit (SKU). Information in the feedback data store about an item may be stored with statistics such as a sales metric (e.g., statistics related to sales of an item or group of items), an inventory metric (e.g., statistics related to inventory such as number of units in inventory), variety (e.g., a measure of diversity of inventory and related information such as addressable market), etc.

In some embodiments, sizing profile data store 303 stores sizing profile information including data associated with a product or group of products. In some embodiments, sizing profile information is categorized by product silhouette category. A product silhouette category may be used to define a unique category of garments, such as sport coats, long sleeve tops, short sleeve tops, three-quarter sleeve tops, pull over tops, sleeveless tops, shorts, and jeans, among others. In some embodiments, the garment shape as well as material or construction additionally define a garment silhouette. Examples of material and/or construction include woven, knit, and denim, among others. For each garment, sizing profile information includes measurements for the garment for each garment size. In some embodiments, measurements are taken based on the garment silhouette category and different silhouette categories include different measurements. For example, measurements for a pant silhouette may include a waist, inseam, thigh, front leg opening, and back leg opening measurement, among others. In contrast, measurements for a short sleeve knit top may include a neck opening, shoulder-to-shoulder, chest, sleeve length from armhole, and bicep measurement, among others. Sizing profile information may also include product information such as objective attributes of the product such as a stock keeping unit (SKU), item type, item property (e.g., color, pattern, material), etc. Product information may include subjective attributes of the product such as suitability for body types, season, etc. Product attributes may be identified by a human or by a machine. Product information may include a representation of the product such as text, image, video, or other form of data.

The inventory interface 305 may be configured to store and retrieve inventory information from one or more inventory data stores. In some embodiments, the inventory interface is an interface to one or more local or remote inventory data stores. For example, using the inventory interface, inventory information may be retrieved and/or updated via a vendor hosting one or more inventory data stores remotely. In some embodiments, an inventory data store includes one or more first-party inventory systems hosted either locally or remotely. In some embodiments, inventory data stores may be structured based on warehouses such that each warehouse has a corresponding inventory data store. In some embodiments, different inventory data stores utilize different interfaces, such as different application programming interfaces or query languages. The inventory interface translates inventory requests and updates to and from the components of FIG. 3 using the appropriate inventory data store interface. In various embodiments, inventory information may include garment or product inventory information including a stock keeping unit (SKU), an item type, an item property (e.g., color, pattern, material), a silhouette category, quantity for each product, as well as historical information along with other similar appropriate inventory information.

In various embodiments, the inventory interface is used to access information about how many units of each item are in the inventory. Supply chain information such as how many units of an item have been ordered, when they are expected to be received to replenish a stock of the item, etc. may be accessed via the inventory interface.

The fit analysis engine 307 determines fit analysis for garments by utilizing data from the feedback data store and sizing profile data store. For example, the fit analysis engine may be utilized to determine the values for variable size components for a particular garment. In some embodiments, fit analysis engine 307 utilizes the data platform to retrieve and/or update data related to feedback, sizing, and/or inventory. The fit analysis engine utilizes the data platform to retrieve feedback on sizing from customers and the sizing profile of the garment and/or related garments to determine the applicable variable size components. In some embodiments, the fit analysis engine may further utilize the data platform to determine the inventory status of one or more garments. For example, when performing fit analysis, the fit analysis engine may utilize inventory information, including historical inventory information, to determine the appropriate variable size components.

The design tool 309 may be configured to employ adaptive machine learning to help a designer design garments for the customers according to the customers' tastes. The designed items may be a hybrid of a base garment sized up or down based on variable size components. The design tool may be configured to execute the processes described herein to design a product, where the product incorporates a predicted size fit satisfaction, as further described herein. For example, a designer may use the design tool 309 to create a new garment from a base garment. The selection of one or more values for variable size components may be based on an optimization goal such as increasing the size fit satisfaction. Thus, the garment may be a result of a combination of machine learning/artificial intelligence selected variable size components, where the variable size components are automatically determined to be among the best measurements to meet an optimization goal. For example, values for the variable size components may be ranked according to how well each meets the size fit satisfaction goal.

For example, to at least in part automatically design a product, a system aggregates data collected from a customer, stylist, and/or designer and measurement data from garments. The data platform may build one or more trained models using machine learning processes further described herein. The training data to train the models may be based on behavior and/or feedback of the customer, stylist, and/or the designer as stored over time in the feedback data store, sizing profile information related to garments as stored in the sizing profile data store, and/or an inventory database accessible via the inventory interface. When a designer selects a base garment, one or more sizing goals are selected via the design tool. The fit analysis engine is used to determine values for the variable size components of the base garment to accomplish the sizing goals. The determined variable size components are presented via the design tool to the designer.

In some embodiments, the designer may choose to size up or down the garment. As another example, the designer may choose to size the base garment to another canonical size from a base canonical size. A canonical base size of medium may be used to scale a garment to an extra-small, small, large, extra-large, etc. As another example, the designer may choose to scale a canonical base size to a size variation of the base size within the same canonical size, such as from a medium to a medium-short and/or a medium-tall. As another example, the designer may choose to scale a base garment to a selection of users, such as a cluster of users. The designer specifies the user or group of users as the target audience instead of specifying a size.

In various embodiments, an alternative size for a variable size component may be determined based at least in part on collaborative filtering and/or client segmentation. For example, an alternative size for a component may be selected based on a likelihood that a size would fall into a cluster (e.g., an addressable market). To determine whether a garment with determined size components would fall into a cluster, a set of features making up the garment may be analyzed to determine whether the set would cause the garment to meet a size fit satisfaction goal (e.g., whether it would be an optimal result to fit analysis). The cluster may be based on feedback such as sizing feedback from the user and sizing measurements obtained from the user's garments.

The recommendations engine 311 may be configured to employ adaptive machine learning to provide recommendations to stylists who select items for customers from an item inventory. For example, the system may use a machine learning trained model to score products. The top scoring products may be provided to the stylist. The stylist (e.g., a human) then selects one or more of the top scoring products to be offered to a customer. The customer may purchase/keep the product and/or provide feedback about the product. The feedback may be used to improve the machine learning training models and may be stored in feedback data store 301.

The data platform 313 may be configured to coordinate operation of feedback data store 301, sizing profile data store 303, inventory interface 305, fit analysis engine 307, design tool 309, and recommendations engine 311. For example, when data is generated by interaction of a customer, stylist, designer, and/or supplier with system 300, the data platform 313 may determine what information is to be stored and where. For example, the data platform may store the feedback data in the feedback data store and sizing profile data in the sizing profile data store. The data platform may also store the data as part of a training data set for machine learning as further described herein. As another example, when measurement data is received for different garments, the data platform may store the measurement data as a sizing profile in the sizing profile data store. As a further example, the data platform may determine to store inventory related data using the inventory interface. For example, in the event the inventory count for a particular garment needs to be retrieved, the data platform may determine that the inventory interface is the appropriate component from which to retrieve the information. The data platform may direct the request for inventory updates to the inventory interface. In various embodiments, data platform 313 may be communicatively coupled to feedback data store 301, sizing profile data store 303, inventory interface 305, fit analysis engine 307, design tool 309, and recommendations engine 311.

In various embodiments, the design tool and fit analysis engine may be configured to perform the processes described herein, e.g., the processes shown in FIGS. 1, 4, 5A, and 6-8, to determine a value for a variable size component and to design a garment using one or more determined values. The design tool 309 may receive input, automatically make design recommendations using machine learning/artificial intelligence, and generate output design specifications. The output of the design tool may be provided to a supplier to manufacture a product according to the specifications of the output.

Figure 6:
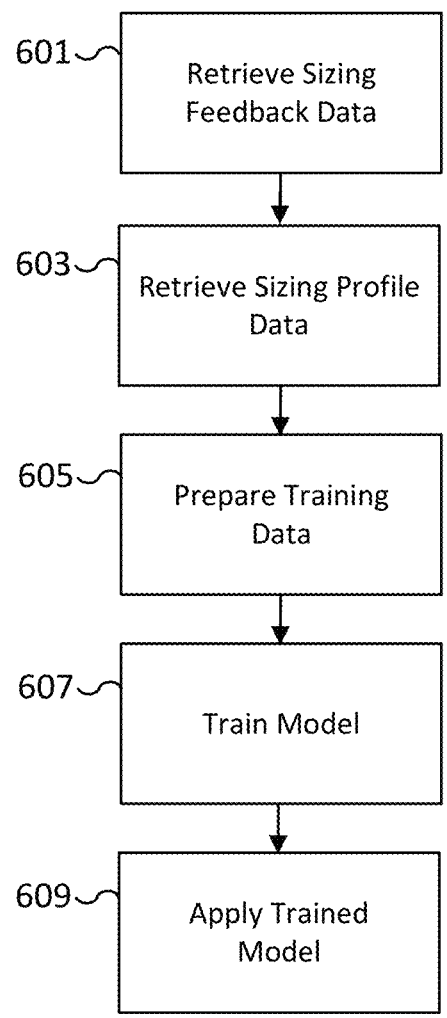
FIG. 6 is a flow chart illustrating an embodiment of a process for machine learning to train one or more prediction models for determining a value for a variable size component.

Machine learning models may include trained models generated from a machine learning process such as the process of FIG. 6. Trained models may be categorized by type such as feedback models, sizing profile models, inventory models, variety models, etc. For each category of model, a model may be generated for each of one or more segments such as segments based on one or more of the following: a garment silhouette, target body type, a target seasonality, a target fiscal quarter, a target customer type or business line (e.g., women, men, children), a target lifestyle, a target product type (e.g., blouse, dress, pants), a target style (e.g., edgy, urban, Pacific Northwest), etc. A model may correspond to a particular segment such as a client segment, time period, etc. For example, a first model may be for the sales performance of a product for a group of customers with a first body type such as petite and a second model may be for the performance of a product for a group of customers with a second body type such as tall.

In some embodiments, a machine learning trained model can be utilized to predict a value for a variable size component of a garment. The model may be trained using past customer feedback data on garment fit and sizing profile information of the garment. The fit results along with the actual garment measurements are incorporated into the training corpus to predict a size fit satisfaction. The training corpus may be trained based on a selected garment silhouette category.

In some embodiments, once a garment is created, a machine learning trained sales model can be further utilized to predict a sales of a product with features indicated to the model. The sales model may be trained using past sales data. In some embodiments, a machine learning trained inventory model can be utilized to predict an inventory metric associated with a created garment with features indicated to the model. The inventory model may be trained using sales data, current inventory information, past inventory information, etc. In some embodiments, a machine learning trained variety model can be utilized to predict a likelihood of whether a garment with features indicated to the model would be desirable to add to an inventory of product offerings to achieve an ideal distribution of inventory variety.

In one aspect, the variety model may be used to identify the value of variety in the inventory even where exactly whom the style is for is typically not identifiable. The variety model may measure a product in terms of the product globally filling a need. The variety model may help expand the total addressable market. That is, even if a product does not perform well with a current customer, the product may perform well with potential/future customers. In another aspect, a customer may prefer having more color choices even if he or she tends to purchase only one color. The customer might like the increased possibility that he or she is purchasing a unique blouse in his or her color because the blouse is offered in many color choices. The variety model may be trained using higher level indications of desired distribution of inventory variety. For example, machine learning training may have to be utilized to determine a higher level model for ideal inventory distribution based on higher level product categories, and the variety model is trained using this higher level model to determine a model for ideal inventory distribution based on product features. For example, a particular blouse style may be offered in three colors. Although one of the colors may not sell as well as the other two colors, providing the third color as an option may represent value in the inventory.

In various embodiments, other models may be utilized. Example models include models for style rating, size rating, fit rating, quality rating, retention, personalization, style grouping, and price value rating as further described herein with respect to FIGS. 1, 4, 5A, and 6-8. These models may be utilized in combination with feedback and sizing models to generate a garment that not only optimizes a size fit satisfaction but also other optimization goals including quality, retention, personalization, style, and price value goals.

In some embodiments, the design tool, fit analysis engine, feedback data store, sizing profile data store, inventory interface, and data platform may be configured to perform the processes described herein, e.g., the processes shown in FIGS. 1, 4, 5A, and 6-8. In some embodiments, the components of FIG. 3 may be communicatively coupled to one another to perform the processes shown in FIGS. 1, 4, 5A, and 6-8 on input received at the fit analysis engine 307 and/or the design tool 309.

Figure 4:
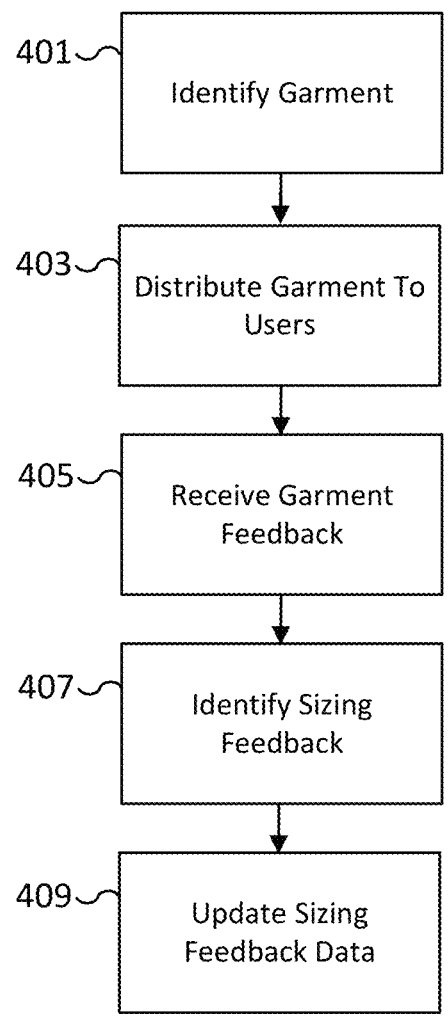
FIG. 4 is a flow chart illustrating an embodiment of a process for collecting sizing feedback.

FIG. 4 is a flow chart illustrating an embodiment of a process for collecting sizing feedback. In some embodiments, the feedback is collected from various users including customers, designers, stylists, and/or vendors. Once collected, the feedback related to sizing information is utilized for training a machine learning model. In some embodiments, once a model is trained, new feedback may be incorporated into the training corpus to update the model. In various embodiments, the feedback may be utilized to train more than one model. In some embodiments, the feedback collected is used for a training process such as the training process described with respect to FIG. 6. In some embodiments, the feedback collected is stored in a feedback data store such as feedback data store 301 of FIG. 3.

At 401, a garment is identified. In some embodiments, the garment is identified by a stock keeping unit (SKU) or a garment identifier. The garment identifier is used to associate the feedback with a sizing profile of the garment. In some embodiments, the identification of the garment includes determining a silhouette category for the garment.

At 403, the garment of 401 is distributed to one or more users. In some embodiments, the garments are distributed to users, such as customers, by a stylist and/or using the recommendation engine 311 of FIG. 3. In some embodiments, the users are customers who are interested in purchasing the garment. For example, a stylist selects a five-piece outfit collection for a customer. Each of the five garments are identified in 401 and distributed to the customer at 403. As an example, the collection may include a long sleeve top, a cardigan, a knit skirt, and leggings. In various embodiments, users may also include stylists, designers, and vendors who may provide feedback on sizing.

At 405, garment feedback is received. For example, a user receiving a garment at 403 may access a feedback form for providing feedback on the garment. In some embodiments, the feedback is an online form, such as a website, where feedback may be provided. In some embodiments, the feedback may be provided over email, SMS, instant messenger, via online chat, over the phone, or other appropriate means. In various embodiments, the feedback includes feedback on the garment style, sizing, fit, quality, print, and price. In some embodiments, the size rating is the accuracy of the listed size. For example, the user provides feedback on whether a garment labeled a size 6 actually fits as the customer expects a size 6 would fit. In some embodiments, the fit rating is a feedback rating on how well the garment fits regardless of the labeled size. For example, a customer may believe that he or she is a size medium for a t-shirt. In the event the garment the customer test fits is labeled as an extra-large size but fits well, the customer would respond with a high fit rating but possibly a low size rating. Additional feedback may include information on retention, personalization, style, material, and other input, as appropriate, in order to achieve recommendation optimization goals.

In some embodiments, feedback on garments includes feedback on the user. For example, user feedback may include user sizes, user measurements, user fitting challenges, and user fit preferences. As an example, sizes and measurements associated with the user may include a user's height, weight, body shape (slim, regular, fit, husky, etc.), chest size, shoulder size, cup size, waist, inseam, shirt size (e.g., small, medium, large), pant size (e.g., inseam and waist), etc. In some embodiments, measurements associated with the user are very limited and may only include a few measurements such as the user's height, canonical shirt size (e.g., small, medium, or large), and canonical pant size. For example, information for a male user may include the user's height, e.g., 5'8" and wears a size medium shirt and 32×32 pants. As another example, information for a female user may include the user's height, cup size, and dress size.

In some embodiments, user feedback includes fit challenges that apply to a particular garment or a set of garments. Examples of fit challenges include sleeve lengths are typically too long or short, cut of pants in the thigh are often too tight, shirts are too tight fitting in the chest, etc. In some embodiments, a user is presented with a list of fit challenges from which to select from and to provide user feedback. In various embodiments, the user provides feedback via an online form, email, in text, or other appropriate means.

In some embodiments, user feedback includes fit preferences that apply to a particular garment or a set of garments. For example, a user may have a fit preference for slim over regular or relaxed dress shirts. As another example, a female user may have a preference for loose rather than fitted tops. In some embodiments, the fit preferences may be matched to a variable size component. For example, fitted and loose fit preferences for female users may be matched to variable size components associated with chest measurements and cup size. In various embodiments, fit challenges and preferences may be utilized in the size fit satisfaction analysis.

In some embodiments, certain sizing feedback is customized based on the garment or silhouette category. As an example, a silhouette category including denim pants may include fit questions related to the sizing for the waist, thighs, and ankles. As another example, a silhouette category including knit dress shirts may include fit questions related to the sizing for the sleeves, shoulders, biceps, and button spacing. In some embodiments, the fit questions are very simple and consist of selecting from one of only a few narrow options such as "too small," "just right," and "too big." In some scenarios, it may be beneficial to the customer user experience by limiting the amount of detail requested from the customer regarding fit. In some embodiments, an initial sizing feedback includes a very simple request for feedback with only a few limited response options but additional detailed feedback may be supplied or requested.

At 407, sizing feedback is identified. For example, the feedback received at 405 includes feedback that is sizing related and not sizing related. In some embodiments, sizing feedback is parsed from the feedback and stored separate from the other feedback. As an example, fit ratings and size ratings data are identified from the feedback received at 405. Non-sizing feedback, such as pricing feedback, style feedback, and pattern feedback may be stored in the same or in a separate data store from sizing feedback. In some embodiments, feedback that impacts sizing but is not related to a measurement of size is also identified as sizing feedback. For example, the material of the garment may be utilized in determining size fit satisfaction since the material has an impact on how well the garment fits. As another example, the garment silhouette category impacts fit ratings since some silhouettes, such as leggings, have a more universal fit and may fit a large variety of body sizes and shapes whereas other silhouettes, such as a suit coat, require many precise points of measurement to ensure an accurate fit.

At 409, sizing feedback data is updated. In some embodiments, the sizing feedback identified at 407 is stored in a feedback data store and used to update a machine learning model. For example, the fit ratings and size ratings feedback data may be stored in a feedback database such as feedback data store 301 of FIG. 3. In various embodiments, the feedback stored is utilized to train a machine learning model to predict size fit satisfaction. In some embodiments, a machine learning model is retrained once a sufficient amount of new feedback is received, when the feedback has aged, at regular intervals, and/or when appropriate.

In some embodiments, the feedback may be associated with a weight or confidence rating corresponding to how much the feedback should be considered when training the machine learning model. For example, feedback from different users or classes of users may be weighed differently. The feedback from a stylist or designer may be weighed more than a new user who is unfamiliar with sizing conventions. In some embodiments, customer feedback is weighed more heavily than feedback from other users, such as a vendor. In some embodiments, the confidence assigned to a user's feedback is based on the past history of the user's feedback. For example, in the event a user has feedback that is very consistent with other users' feedback, then the user's feedback may be weighed more heavily than another user whose feedback is very sparse and/or mismatched with other users' feedback.

Figure 5A:
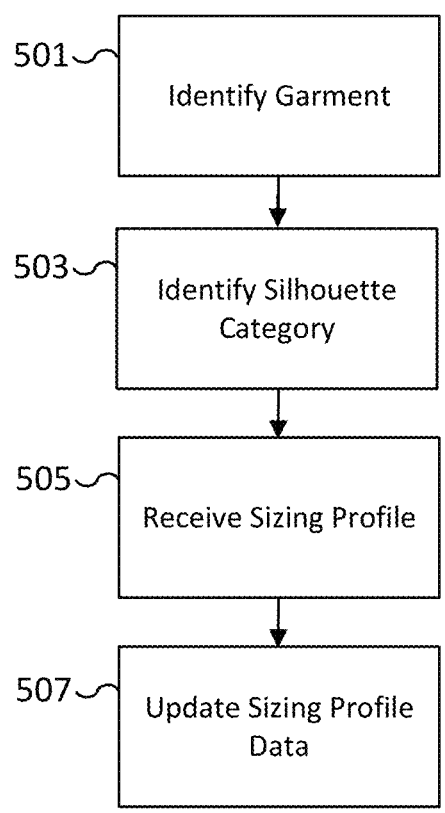
FIG. 5A is a flow chart illustrating an embodiment of a process for collecting sizing profiles.

FIG. 5A is a flow chart illustrating an embodiment of a process for collecting sizing profiles. In some embodiments, the sizing measurements for various garments are collected for training a machine learning model to predict size fit satisfaction. In some embodiments, once a model is trained, new garment sizing data may be incorporated into the training corpus to update the model. In various embodiments, the sizing data may be utilized to train more than one model. In some embodiments, the sizing data collected is used for a training process such as the training process described with respect to FIG. 6. In some embodiments, the sizing data collected is stored in a sizing profile data store such as sizing profile data store 303 of FIG. 3.

At 501, a garment is identified. For example, a new garment is made available and selected for inclusion into the training data set. In some embodiments, the garment may be a new garment available for customers to purchase. At 501, the garment is identified using a garment identifier such as a stock keeping unit (SKU). In some embodiments, the garment identifier is used to associate the garment's sizing measurements with customer sizing feedback from test fitting the garment.

At 503, the silhouette category of the garment of 501 is identified. For example, an operator may select the silhouette category a garment belongs to. In some embodiments, the garment silhouette category is determined automatically using image recognition and/or a machine learning application of image recognition to classify the garment into a silhouette category.

At 505, a sizing profile for the garment of 501 is received. As discussed previously, in some embodiments, a garment silhouette defines various points of measurement for a garment. The garment's points of measurement are received and a sizing profile using those measurements is created. In some embodiments, the sizing profile for a garment is stored in a sizing profile data store such as sizing profile data store 303 of FIG. 3. As an example, a designer determines the garment's silhouette at 503 and provides the corresponding points of measurement for the garment at 505. In some embodiments, the vendor and/or manufacturer of the garment provides the measurements.

At 507, sizing profile data is updated. In some embodiments, the sizing profile data received at 505 is stored in a sizing profile data store and used to update a machine learning model. For example, the sizing profile data may be stored in a sizing profile database such as sizing profile data store 303 of FIG. 3. In various embodiments, the sizing profile stored is utilized to train a machine learning model to predict size fit satisfaction. In some embodiments, a machine learning model is retrained once a sufficient amount of new sizing profile data is received, when the sizing profile data has aged, at regular intervals, and/or when appropriate.

Figure 5B:
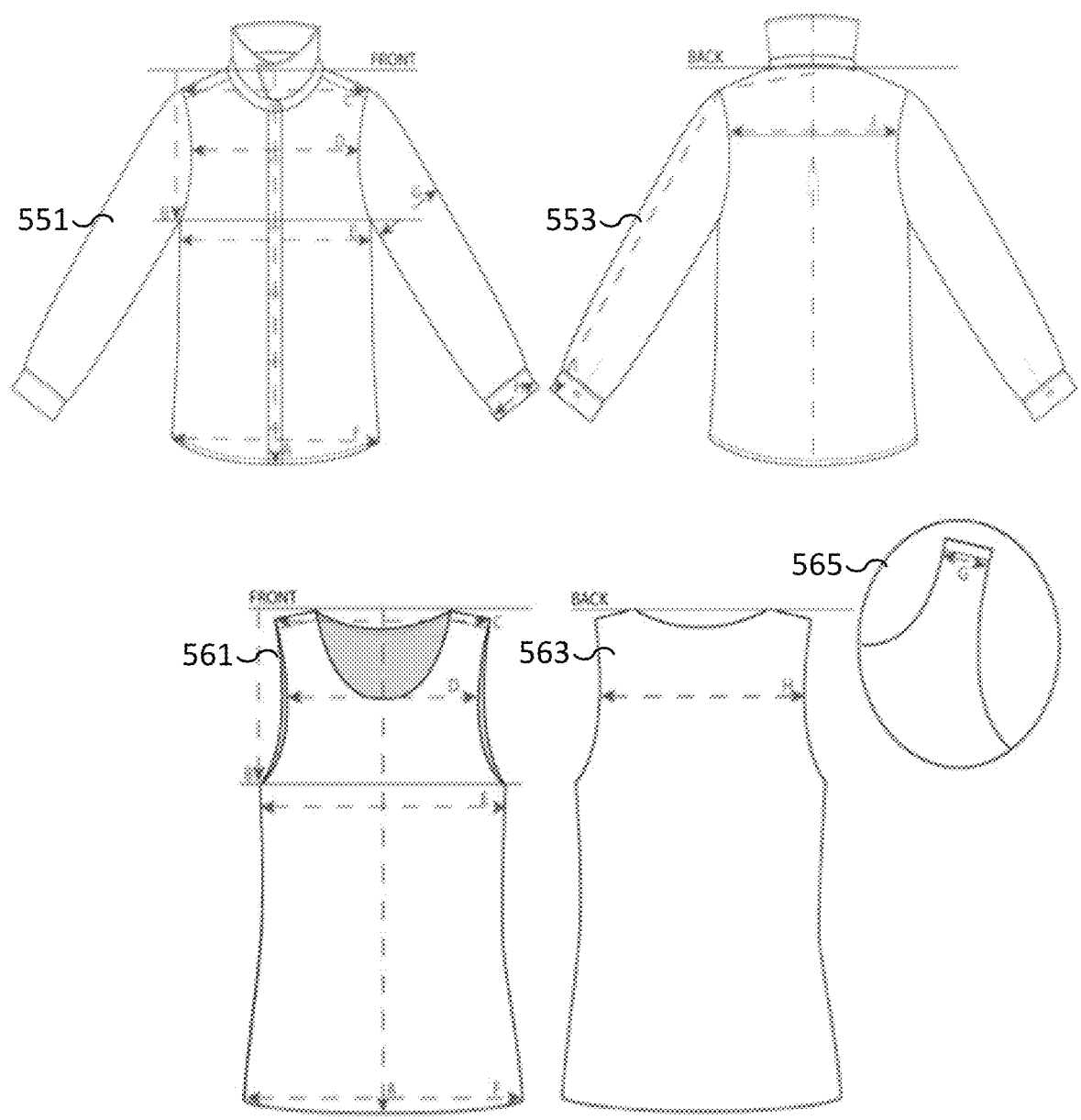
FIG. 5B is a diagram illustrating various embodiments of measurement data collected for creating sizing profiles.

FIG. 5B is a diagram illustrating various embodiments of measurement data collected for creating sizing profiles. For example, each garment silhouette category includes a list of measurements, or points of measurement, that are critical to a garment's fit. Depending on the accuracy of the fit, more or fewer points of measurement may be required. The diagram of FIG. 5B includes the front and back of a long sleeve shirt silhouette category and the front, back, and shoulder of a sleeveless pull-over silhouette category. A long sleeve shirt front 551, a long sleeve shirt back 553, a sleeveless pull-over front 561, a sleeveless pull-over back 563, and a sleeveless pull-over shoulder 565 are shown. In some embodiments, the measurement data collected is used for a training process such as the training process described with respect to FIG. 6. In some embodiments, the measurement data collected is stored in a sizing profile data store such as sizing profile data store 303 of FIG. 3.

With respect to long sleeve shirt front 551, examples of points of measurement and their corresponding alphabet labels include a body length from high point shoulder (A), armhole depth from high point shoulder (B), across shoulder (C), across front 5" from high point shoulder (D), chest 1" from armhole (E), sweep straight (F), bicep 1" from armhole (G), and sleeve opening (H). With respect to long sleeve shirt back 553, the points of measurement and their corresponding alphabet labels include sleeve length from center back neck (I) and across back 5" from high point shoulder (J).

As another example, a sleeveless pull-over front, back, and shoulder are shown with corresponding points of measurement for a sleeveless pull-over garment silhouette category. With respect to sleeveless pull-over front 561, examples of points of measurement and their corresponding alphabet labels include body length from high point shoulder (A), armhole depth from high point shoulder (B), across shoulder (C), across front 5" from high point shoulder (D), chest 1" from armhole (E), and sweep straight (F). With respect to sleeveless pull-over back 563, an example of a point of measurement and its corresponding alphabet label includes across back 5" from high point shoulder (H). With respect to sleeveless pull-over shoulder 565, an example of a point of measurement and its corresponding alphabet label includes strap width for each side along seam (G).

FIG. 6 is a flow chart illustrating an embodiment of a process for machine learning to train one or more prediction models for determining a value for a variable size component. The process of FIG. 6 may be at least in part implemented on one or more components of system 300 shown in FIG. 3. In some embodiments, the process of FIG. 6 is performed by processor 201 of FIG. 2. In some embodiments, the models trained using the process of FIG. 6 are utilized by the processes for FIGS. 1, 7, and 8.

At 601, sizing feedback data is retrieved. In some embodiments, sizing feedback data is retrieved from a feedback data store such as feedback data store 301 of FIG. 3. The sizing feedback data includes sizing information from users who have tested a particular garment. The sizing feedback data may include user size attributes, user sizing ratings, and user fit ratings. In some embodiments, user size attributes include size measurements, fit challenges, and fit preferences of the user. For example, size measurements may include the body shape, height, and weight of the user as well as more detailed measurements such as the user's shoulder width, inseam, waist, chest, cup size, shirt size, pant size, etc. In some embodiments, fit challenges are utilized and may include body specific challenges for achieving a good fit rating. Examples of fit challenges include sleeve length is too long or short, thigh diameter is too small, and chest is too loose or tight. In some embodiments, fit preferences are utilized and may include body specific preferences such as slim v. regular v. relaxed or fitted v. loose shirts. In some embodiments, the sizing rating reflects a customer's feedback on the accuracy of the size label for a given garment. In some embodiments, the fit rating reflects how well the given garment fits the customer. In various embodiments, the feedback data includes a garment identifier, such as a stock keeping unit (SKU), for preparing the data and merging the feedback data with sizing profile data.

At 603, sizing profile data is retrieved. In some embodiments, sizing profile data is retrieved from a sizing profile data store such as sizing profile data store 303 of FIG. 3. The sizing profile data includes sizing measurement information for garments. In some embodiments, the sizing profile data is retrieved only for garments that have user feedback. In some embodiments, sizing profile data is retrieved only for garments of the same silhouette category. In various embodiments, the sizing profile data includes various measurements or points of measurement of the garment. In some embodiments, the measurements are associated with a garment silhouette category. In various embodiments, the sizing profile data includes a garment identifier, such as a stock keeping unit (SKU), for preparing the data and merging the sizing profile data with user feedback data.

At 605, training data retrieved at 601 and 603 is prepared. For example, the user feedback and sizing profile data for a particular garment is collected, merged, and prepared into a training data for a training corpus. In some embodiments, the data is prepared into a training data set and a validation set. Thus a portion of the data is utilized for training and a separate portion is utilized for validating the training results.

In some embodiments, different prediction models can be trained for different prediction model categories or segments. To train each of the different models, different sets of training data can be gathered specifically for different models to be trained. For example, past data associated with a variable size component to be predicted for a particular garment silhouette category is gathered for various different segments, and different models of the particular silhouette category may be trained for each of the various different segment combinations.

In some embodiments, the preparation of the training data includes selecting learning features and parameters. The selection of features to be utilized in prediction models can be defined at least in part by a human user or at least in part by automatically being determined. For example, a human or artificial intelligence may define features of the prediction models to be trained and thus the necessary training data.

In various embodiments, the features may be based at least in part on natural language processing (NLP). For example, a computer system may extract information from text according to NLP techniques. Text generated by and about customers such as in product reviews, comment forms, social media, emails, and the like may be analyzed by an NLP system to determine customer size and fit ratings. For example, a customer may provide feedback (e.g., text) when they receive an item. The feedback provided by the customer may be processed with NLP techniques to extract features. NLP techniques include rule-based engines, clustering, and classification to make determinations about characteristics of a product that might be considered a feature. Features may be identified by machine learning or computer vision or NLP, and recommended for inclusion in a product design. In various embodiments, term frequency-inverse document frequency (TFIDF), latent Dirichlet allocation (LDA), colocation analyses, and the like can be used to create lower-dimensional representations of styles or to generate words or phrases representing styles. Various machine learning methods can then predict metrics/optimization goals using these features. Features that predict the optimization goal can then be related back to variable size components based on garment silhouette categories.

At 607, a machine learning model is trained using the training data prepared at 605. In supervised machine learning, training data may be utilized to train a prediction model to perform predictions based on information "learned" from the training data. In some embodiments, more than one machine learning model is trained. For example, models may be trained by categorized type such as by garment silhouette category (e.g., knit blouse, woven dress, denim pants, etc.), target body type, target seasonality, target fiscal quarter, target customer type or business line (e.g., women, men, children), target lifestyle, target style (e.g., edgy, urban, Pacific Northwest), etc. Different client and garment segments may be used to categorize the model types depending on the optimization goal.

In some embodiments, a prediction model of a particular model type can be utilized to predict a size fit satisfaction for a variable size component with features indicated to the model. As an example, size and fit training data from user feedback of different denim skirts and corresponding sizing profiles for the denim skirts are utilized to train a denim skirt silhouette category model. The trained denim skirt silhouette category model may be used to infer the size fit satisfaction of a new garment with particular values for the variable size components. Moreover, the trained denim skirt silhouette category model may be utilized to optimize the size fit satisfaction to generate values for the variable size components that optimize fit rating for a particular user or group of users. The values of the variable size components may be utilized to manufacture a new garment with the determined measurement values and/or to make purchase decisions from different vendors offering different garment variation sizes.

In various embodiments, the model may be trained according to supervised learning or other machine learning techniques. In supervised learning, the objective is to determine a weight of a feature in a function that optimizes a desired result, where the function is a representation of the relationship between the features. In a training process, weights associated with features of a model are determined via the training. That is, the contribution of each feature to a predicted outcome of the combination of features is determined. In various embodiments, the model may be trained using mixed effects models that take into account several features, some of which may be non-independent. The model may be trained by ridge regression that attributes credit to a particular feature.

In some embodiments, when training a model, the attribution of each feature to the output of the function is determined. In some embodiments, a feature represents a combination of features. For example, an individual feature may have a different weighting when that feature is combined with another feature. A feature or set of features may define a base option. As more input is provided to a model, the output of the function becomes closer to a target or validation result.

In various embodiments, a model may be evaluated after the model has been trained. The error of a model is the difference between actual performance and modeled performance. In another aspect, in some situations, a well-trained model may nevertheless diverge from an actual result. In this situation, a product may have an aspect that makes the product perform better than expected. For example, the garment may perform better, such as fit better, than predicted by a trained model. The description of the factor for success is an aspect. This aspect can be leveraged by incorporating the aspect into new garments.

At 609, the trained machine learning model is applied. In some embodiments, for each model type, multiple versions of the model exist. As additional data is collected and prepared, new versions of the model are trained and prepared for production use. For example, as customers test fit new garments, additional sizing information is collected for the garment and added to a training set for a garment silhouette category. Training with the additional data allows for a more accurate training model. In some embodiments, once a model has been validated, the model is transferred to a production system and utilized with a machine learning engine for use in predicting a size fit satisfaction. For example, a trained machine learning model is transferred into a machine learning engine, such as fit analysis engine 307 of FIG. 3, and utilized by a design tool, such as design tool 309 of FIG. 3, for generating optimal measurements for a new garment size.

Figure 7:
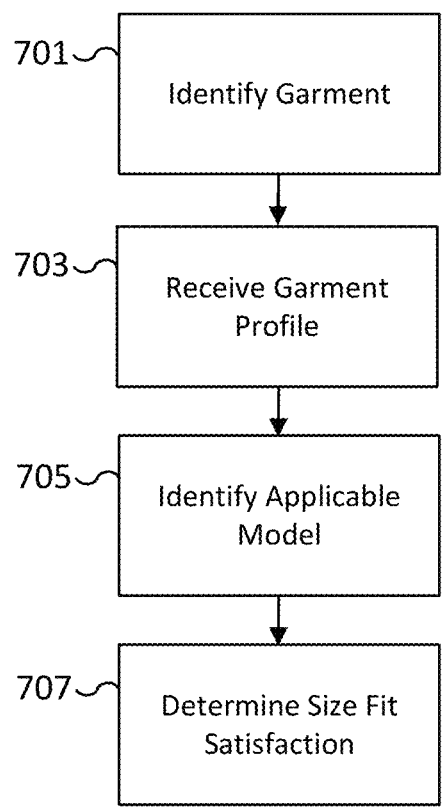
FIG. 7 is a flow chart illustrating an embodiment of a process for determining a size fit satisfaction for a garment.

FIG. 7 is a flow chart illustrating an embodiment of a process for determining a size fit satisfaction for a garment. For example, the process of FIG. 7 may be utilized to determine how well a vendor's or manufacturer's garment will fit a target customer audience. In some embodiments, the determined size fit satisfaction is a probability corresponding to how well the garment fits a target audience and may be used in purchasing decisions. For example, in the event a garment has a high predicted size fit satisfaction, it may be desirable to closely monitor the inventory for the garment size with an eye on increasing inventory. There is a strong likelihood that the garment will fit well for the target customer and will result in customers purchasing the garment. In contrast, in the event the garment has a low predicted size fit satisfaction, the garment will likely sell poorly and a decision can be made to not purchase the garment in that size. As another example, a process of FIG. 7 may be utilized to determine a target audience with a high size fit satisfaction for a particular size. Thus inventory and stock decisions on how many of a particular size to purchase may be based on the size of the optimal target audience. The process of FIG. 7 may be at least in part implemented on one or more components of system 300 shown in FIG. 3 including fit analysis engine 307 utilizing data from feedback data store 301, sizing profile data store 303, and inventory interface 305. In some embodiments, the process of FIG. 7 is performed by processor 201 of FIG. 2.

At 701, a garment is identified. In some embodiments, the garment is identified based on a garment identifier or a stock keeping unit (SKU). In some embodiments, the garment identifier is utilized to associate sizing and feedback data for the garment. At 703, a garment profile is received. In some embodiments, a garment profile corresponds to a silhouette category and appropriate sizing measurements. In various embodiments, the garment profile includes measurements for each point of measurement of the garment silhouette category the garment belongs to. In some embodiments, a prediction of a size fit satisfaction may be performed even in the event all measurements are not provided. In some embodiments, the accuracy of the size fit satisfaction increases with additional and more precise measurements. In various embodiments, features of the machine learning model correspond to the information from the garment profile.

At 705, one or more applicable models are identified. For example, a model type corresponding to the garment profile of 703 is selected. In some embodiments, a model is selected based on a silhouette category. In some embodiments, a model is selected based on the target audience of the garment, such as new customers, long-time customers, location of the customers, customers interested in certain seasonal garments, customer past purchase history, etc. The model selection may be further segmented based on an optimization goal. For example, in the event the garment identified in 701 is a women's formal evening gown, the applicable model may target a silhouette category corresponding to formal long evening gowns and sub-segments may include filters for customers who have viewed evening gowns in the past 30 days and have in the past purchased a garment over a certain price point. In some embodiments, the model selection is determined automatically by solving for a high size fit satisfaction. In some embodiments, the applicable models are trained using the process described in FIG. 6.

At 707, a size fit satisfaction is determined using the applicable model selected at 705 and the features from the garment profile in 703. In some embodiments, the size fit satisfaction is a probability corresponding to the likelihood the garment will fit the target audience. For example, a new knit short-sleeve pullover is offered by a garment brand manufacturer. In order to decide whether to purchase the pullover garment and what size(s) to purchase, at 707, a size fit satisfaction is determined for the garment using a target audience. In various embodiments, the size fit satisfaction corresponds to a prediction of how well the garment will fit the intended audience. Customers are typically much more likely to purchase a product or garment with a high size fit satisfaction over a low size fit satisfaction. The inventory can be adjusted and the warehouse stocked with sizes of the garments that have a high size fit satisfaction.

Figure 8:
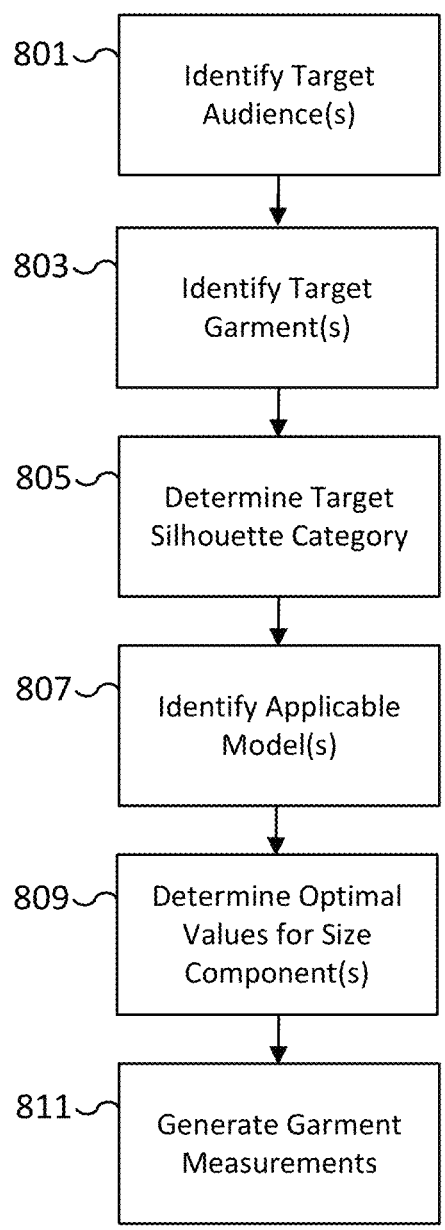
FIG. 8 is a flow chart illustrating an embodiment of a process for generating a computer designed garment using determined variable size components.

FIG. 8 is a flow chart illustrating an embodiment of a process for generating a computer designed garment using determined variable size components. In the example shown, the process of FIG. 8 may be utilized to generate the measurements necessary for the manufacture of a garment that has been sized up or down from a base garment. The sized garment may be generated to target a particular target audience where the size fit satisfaction has been optimized. The process of FIG. 8 may be at least in part implemented on one or more components of system 300 shown in FIG. 3 including fit analysis engine 307 and design tool 309 utilizing data from feedback data store 301, sizing profile data store 303, and inventory interface 305. In some embodiments, the process of FIG. 8 is performed by processor 201 of FIG. 2.

At 801, one or more target audiences are identified. Different target audiences may be identified by a human operator or automatically. For example, target audiences may be identified automatically by clustering users by feature set. The feature set may include properties of the target user including user measurement sizes, user fit challenges, user fit preferences, user purchase history, user style preferences, user location, etc.

At 803, one or more target garments are identified. For example, popular garments are identified and may be determined based on metrics including purchase history and return metrics. In some embodiments, popular garments are determined based on clustering the purchase history for customers. In some embodiments, garments are identified based on features such as inventory information, profit margin, and customer retention. In some embodiments, features include not only purchase history but also social media activity, web browsing activity, surveys, product reviews, and the like. In various embodiments, a human operator determines the target garments. In some embodiments, the target garments are determined automatically or may be identified using artificial intelligence and/or machine learning with the assistance of a human, such as a designer or stylist.

At 805, a target silhouette category is determined based on the target garments of 803. In some embodiments, a human may select the target silhouette category that corresponds to the garment that measurements will be determined for. In various embodiments, the target silhouette category is selected automatically or by a human with the help of an automated system. For example, the target garments identified at 803 are analyzed and used to determine one or more options for target silhouette categories. In some embodiments, inventory is accessed to determine stock levels, which may be used in deciding a target silhouette category. For example, a knit three-quarter length shirt may be selected as a target silhouette category in the event that knit three-quarter length shirts are popular but are low in inventory. As another example, knit three-quarter length shirts may be selected in the event that knit three-quarter length shirts from a particular brand are frequently purchased but have a high return rate for poor size fit satisfaction. The creation and availability of a new garment using the garment silhouette category but optimized for size fit satisfaction will have a high likelihood of achieving a lower return rate.

At 807, applicable machine learning models are identified. In various embodiments, the appropriate machine learning model is selected based on the target goal. For example, the model may be selected based on the target audience of 801 and target silhouette category of 805. In some embodiments, the models are selected based on the features associated with the target audience and target garment silhouette. For example, a model associated with knit three-quarter length shirts and maternity customers may be selected.

At 809, optimal values for variable size components are determined. The machine learning model identified at 807 is used in conjunction with the target audience and target silhouette category to determine a size fit satisfaction. In some embodiments, the values for variable size components are determined by optimizing the size fit satisfaction. For example, size fit satisfaction may be optimized by applying a cost function analysis. The values for the variable size components corresponding to an optimum size fit satisfaction are presented as the optimal values for the variable size components. For example, the sleeve length and chest size corresponding to a dress shirt that achieves the optimal size fit satisfaction for the target audience are the determined values for the respective variable size components.

At 811, garment measurements are generated. In various embodiments, the measurements may be utilized for the manufacture of a newly sized garment. In some embodiments, the measurements may be used for generating a design sheet having specifications for manufacturing the newly sized garment. For example, the measurements generated correspond to variable size components such as sleeve length, across shoulder, sweep straight, sleeve opening, etc., necessary for the accurate manufacturing of a garment to achieve a high fit rating. In various embodiments, the generated garment is custom sized to the target audience. By varying the audience, different size variations of the same style of garment may be generated and manufactured. In this manner, a range of sizes for a particular garment style may be manufactured to cover the entire customer base with a high likelihood that all customers will have a size available that fits well. The quantity of each generated garment may be based on the size of the target audience. In this manner, inventory levels may be optimized based on fit for potential customers.

The process of FIG. 8 is an example embodiment for the application of a machine learning model and machine learning engine for predicting size fit satisfaction. The inputs for the machine learning model may be modified to solve for different optimization goals. For example, the feature set of the model and the model type may be modified based on the target audience, target garment for creation, and business goals. In some embodiments, the goal is to identify and manufacture a garment that is sized to fit a target audience or a collection of garment sizes to fit a wider target audience. Another goal may be to identify popular garment silhouette categories that have high return rates due to poor sizing and fit errors. As described herein, the machine learning model and machine learning engine may be utilized to determine optimal values for variable size components of a difficult to fit garment silhouette category. As another goal, the machine learning model and machine learning engine may be utilized to generate sizing and measurements for manufacturing new garment sizes for customers who have difficulty finding clothes that fit well. Customers with fit challenges report fit issues such as garments that are too long or short for one's body length, too tight in the thighs, too tight or loose in the chest, etc. By optimizing for size fit satisfaction with this target audience in mind, these fit challenges can be addressed by manufacturing or offering new garment sizes using determined values for variable size components.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
using a processor to train a machine learning model for predicting a size fit satisfaction for a variable size component associated with a base garment, wherein the base garment is associated with one or more fixed size components and one or more variable size components, wherein the machine learning model is trained using at least sizing profiles of a plurality of items and feedbacks of subjects regarding sizing of the plurality of items;
using the machine learning model to determine a value for the variable size component that corresponds to an optimal predicted size fit satisfaction; and
providing the determined value of the variable size component for use in creating a new item with a sizing variation based on the determined value, wherein the new item is manufactured based on the one or more fixed sized components and at least the determined value of the variable size component.

2. The method of claim 1, wherein the machine learning model is trained using at least the sizing profiles of the plurality of items selected as matching a silhouette category of the new item and the feedbacks.

3. The method of claim 1, wherein the machine learning model is trained using at least the feedbacks of the subjects with a sizing profile that matches a silhouette category to be optimized.

4. The method of claim 1, further comprising manufacturing the new item.

5. The method of claim 1, wherein creating the new item includes providing the base garment.

6. The method of claim 1, wherein the feedbacks of the subjects regarding sizing of the plurality of items include body measurements of the subjects.

7. The method of claim 6, wherein the body measurements of the subjects include a body height, a sleeve length, or a body shape.

8. The method of claim 6, wherein the body measurements of the subjects include a body height or a cup size.

9. The method of claim 1, wherein the feedbacks of the subjects regarding sizing of the plurality of items include fit challenges.

10. The method of claim 9, wherein the fit challenges include a sleeve length, neck size, or chest size fit challenge.

11. The method of claim 1, wherein the feedbacks of the subjects regarding sizing of the plurality of items include fit preferences.

12. The method of claim 11, wherein the fit preferences include a slim, a regular, and a relaxed fit preference.

13. The method of claim 11, wherein the fit preferences include a loose or a fitted fit preference.

14. The method of claim 1, wherein the feedbacks of the subjects regarding sizing of the plurality of items include a fit rating or a size rating.

15. The method of claim 1, wherein the plurality of items each has a silhouette category.

16. The method of claim 15, wherein the silhouette category defines a collection of measurements.

17. The method of claim 16, wherein the measurements include a shoulder-to-shoulder, chest, sleeve length, or bicep measurement.

18. The method of claim 16, wherein the measurements include a waist, thigh, knee, rise, leg opening, or inseam measurement.

19. A system, comprising:
a processor; and
a memory coupled with the processor, wherein the memory is configured to provide the processor with instructions which when executed cause the processor to:
train a machine learning model for predicting a size fit satisfaction for a variable size component associated with a base garment, wherein the base garment is associated with one or more fixed size components and one or more variable size components, wherein the machine learning model is trained using at least sizing profiles of a plurality of items and feedbacks of subjects regarding sizing of the plurality of items;
use the machine learning model to determine a value for the variable size component that corresponds to an optimal predicted size fit satisfaction; and
provide the determined value of the variable size component for use in creating a new item with a sizing variation based on the determined value, wherein the new item is manufactured based on the one or more fixed size components and at least the determined value of the variable size component.

20. A computer program product, the computer program product being embodied in a non-transitory computer readable storage medium and comprising computer instructions for:
training a machine learning model for predicting a size fit satisfaction for a variable size component associated with a base garment, wherein the base garment is associated with one or more fixed size components and one or more variable size components, wherein the machine learning model is trained using at least sizing profiles of a plurality of items and feedbacks of subjects regarding sizing of the plurality of items;
using the machine learning model to determine a value for the variable size component that corresponds to an optimal predicted size fit satisfaction; and
providing the determined value of the variable size component for use in creating a new item with a sizing variation based on the determined value, wherein the new item is manufactured based on the one or more fixed size components and at least the determined value of the variable size component.

* * * * *